Patented Sept. 22, 1953

2,653,154

UNITED STATES PATENT OFFICE 2,653,154

BENZOTHIAZOLE DERIVATIVES AND METHOD OF MANUFACTURE

Norbert Steiger, Nutley, and Oscar Keller, Clifton, N. J., assignors to Hoffmann-La Roche Inc., Nutley, N. J., a corporation of New Jersey No Drawing. Application May 29, 1951, Serial No. 228,976

The portion of the term of the patent subsequent to December 17, 1968, has been disclaimed 7 Claims. (Cl. 260—305)

1

This invention relates to new derivatives of benzothiazoles and to the process for their manufacture. More particularly, the invention relates to 2-mono lower alkylamino-6-(dialkylaminoalkoxy)-benzothiazoles wherein the "alkoxy" radical contains from 2 to 5 carbon atoms, and the acid addition salts thereof. The new compounds are characterized by their activity against fungi and are useful in combating such organisms, for instance, the pathogenic fungi *Trichophyton mentagrophytes* and *Microsporon lanosum*.

The 2-mono lower alkalyamino-6-(dialkylaminoalkoxy)-benzothiazoles are prepared by reacting a 2-mono lower alkylamino-6-hydroxy-benzothiazole in the form of its alkali metal salt, as for example, the sodium, potassium or lithium salts, with a dialkylaminoalkyl halide, for example, dialkylaminoethyl chloride, dialkylaminopropyl chloride, dialkylaminobutyl chloride, dialkylaminopentyl chloride, 2-chloro-1-dialkylamino-propane, 1-chloro-2,2-dimethyl-3-dialkylamino-propane and the like. The reaction is preferably carried out in the presence of an organic solvent or diluent as, for example, chlorobenzene, toluene, xylene, etc.

The 2-mono lower alkylamino-6-(dialkylaminoalkoxy)-benzothiazoles can be recovered from the reaction medium as the free bases by removing the organic solvent; or as the acid addition salts thereof, for example, as the hydrochlorides or hydrobromides by passing hydrogen chloride or hydrogen bromide into the reaction medium. The free bases readily yield acid addition salts of both organic and inorganic acids. Thus, by treating the bases with an equivalent amount of an acid, as for example, hydrochloric, hydrobromic, sulfuric, phosphoric, nitric, acetic, propionic, caprylic, undecylic, tartaric and citric acids, the corresponding acid addition salts of the 2-mono lower alkylamino-6-(dialkylaminoalkoxy)-benzothiazoles are obtained.

The 2-mono lower alkylamino-6-hydroxy-benzothiazoles are readily prepared from the corresponding 2-mono lower alkylamino-6-alkoxy-benzothiazoles by hydrolysis with aluminum chloride in a suitable solvent, such as chlorobenzene. The 2-mono lower alkylamino-6-alkoxy-benzothiazoles can be prepared by various methods. Thus, according to one method, a p-lower alkoxyphenylisothiocyanate is condensed with a mono lower alkylamine to produce the 1-(p-lower alkoxyphenyl)-3-alkyl-thiourea which upon reaction with bromine produces the desired 2-mono lower alkylamino-6-alkoxy-benzothiazole. According to another procedure, an alkali metal salt

2 of 6-alkoxy-benzothiazole-2-sulfonic acid is reacted under pressure with a lower mono alkylamine to produce the 2-mono lower alkylamino-6-alkoxy-benzothiazole directly.

The following examples will illustrate the preparation of the 2-mono lower alkylamino-6-hydroxy-benzothiazoles.

EXAMPLE A

*6-hydroxy-2-n-butylamino-benzothiazole*

50 grams of 6-ethoxy-2-n-butylamino-benzothiazole were suspended in 400 cc. of chlorobenzene. 60 grams of aluminum chloride were slowly added, the temperature rising to 55° C. The mixture was refluxed at 134° C. for 5½ hours. After cooling to room temperature, the complex was decomposed with small amounts of ice. The chlorobenzene was steam distilled off and the aqueous residue was treated with 40 cc. of concentrated hydrochloric acid. After cooling for about 16 hours at 4° C. the aqueous layer was decanted and the oily residue was dissolved in 600 cc. of N sodium hydroxide by heating to 55° C. The solution was filtered and cooled in ice. It was acidified to litmus by the addition of 40 cc. of acetic acid. The 6-hydroxy-2-n-butylamino-benzothiazole was filtered off and upon crystallization from aqueous alcohol melted at 108° C.

EXAMPLE B

*6-hydroxy-2-isobutylamino-benzothiazole*

140 grams of 6-ethoxy-benzothiazole-2-sulfonic acid sodium salt were heated with 100 grams of isobutylamine in 500 cc. of water in the presence of 10 grams of zinc chloride at 125° C. for 8 hours under 150 lbs. nitrogen pressure. The reaction mixture was diluted to 1500 cc. with water and the product was filtered off. Upon crystallization of the 6-ethoxy-2-isobutylamino-benzothiazole thus formed from dilute methanol, it melted at 139–140° C. 27 grams of the compound were suspended in 250 cc. of chlorobenzene. 35 grams of aluminum chloride were slowly added and the mixture was refluxed at 133° C. for 3½ hours. After cooling to 40° C. the complex which formed was decomposed by the addition of small amounts of ice. The chlorobenzene was steam distilled off and the aqueous residue was treated with 15 cc. of concentrated hydrochloric acid. After cooling at 4° C. for about 16 hours, the aqueous layer was decanted and the residual oil was dissolved in 1500 cc. of N sodium hydroxide at 85° C. The mixture was filtered through a diatomaceous earth filter and the filtrate was cooled in ice and acidified to litmus with 100 cc. of acetic acid. The 6-hydroxy-2-isobutylamino-benzothiazole thus obtained was filtered off and upon crystallization from aqueous ethanol melted at 166–168° C.

EXAMPLE C

*6-hydroxy-2-n-propylamino-benzothiazole*

70 grams of 6-ethoxy-benzothiazole-2-sulfonic acid sodium salt were heated with 65 grams of n-propylamine, 500 cc. of water and 10 grams of zinc chloride at 125° C. for 8 hours under 150 lbs. per square inch nitrogen pressure. The reaction mixture was diluted with water and the 6 - ethoxy - 2 - n - propylamino - benzothiazole thus formed was filtered off. Upon crystallization from aqueous ethanol it melted at 105° C. To 55 grams of the compound, suspended in 500 cc. of chlorobenzene, 75 grams of aluminum chloride were slowly added. The resulting mixture was refluxed at 133° C. for 3½ hours. After cooling to 50° C. the complex that formed was decomposed by the addition of small amounts of ice. The chlorobenzene was steam distilled off and the aqueous residue was treated with 20 cc. of concentrated hydrochloric acid. After cooling for about 16 hours at 4° C. the precipitate which formed was filtered off and dissolved in 1500 cc. of N sodium hydroxide by heating it to 85° C. The solution was filtered with diatomaceous earth and the filtrate was cooled in ice and was acidified to litmus with 100 cc. of glacial acetic acid. The 6-hydroxy-2-n-propylamino-benzothiazole thus formed was filtered off and upon crystallization from aqueous ethanol melted at 133–135° C.

EXAMPLE D

*6-hydroxy-2-n-amylamino-benzothiazole*

28 grams of 6-ethoxy-benzothiazole-2-sulfonic acid sodium salt were heated with 37 grams of n-amylamine, 250 cc. of water and 5 grams of zinc chloride at 125° C. for 6 hours under 150 lbs. nitrogen pressure. The insoluble oily product was extracted with petroleum ether. The organic solvent was evaporated. The residue was suspended in 400 cc. of water and upon cooling at 4° C. for about 16 hours, 6-ethoxy-2-n-amylamino-benzothiazole precipitated. Upon crystallization from aqueous ethanol the compound melted at 59–60° C. 20 grams of the compound were suspended in 250 cc. of chlorobenzene and 35 grams of aluminum chloride were slowly added. The mixture was heated to reflux at 133° C. for 3½ hours. After cooling to 40° C. the complex which formed was decomposed by the addition of small amounts of ice. The chlorobenzene was steam distilled off and the aqueous residue was treated with 15 cc. of concentrated hydrochloric acid. After cooling at 4° C. for about 16 hours the aqueous mixture was decanted and the residual oil was treated with 1000 cc. of N sodium hydroxide at 85° C. The solution was filtered with diatomaceous earth, the filtrate was cooled in ice and acidified to litmus with 70 cc. of glacial acetic acid. The 6-hydroxy-2-n-amylamino-benzothiazole thus obtained was filtered off and upon crystallization from aqueous alcohol melted at 96–98° C.

EXAMPLE E

*6-hydroxy-2-methylamino-benzothiazole*

28.5 grams of 6-ethoxy-2-methylamino-benzothiazole were suspended in 300 cc. of chlorobenzene and 40 grams of aluminum chloride were slowly added with stirring. The resulting mixture was refluxed at 130–135° C. for 5 hours. After cooling, the complex was decomposed by the addition of small amounts of ice. The solvent was steam distilled off and the aqueous residue was treated with 25 cc. of concentrated hydrochloric acid and 100 grams of sodium chloride. The mixture was cooled in ice and the precipitate was filtered off. It was dissolved in 600 cc. of 10% sodium hydroxide at 60° C. and filtered with diatomaceous earth. Upon acidification of the filtrate to litmus with 100 cc. of concentrated hydrochloric acid, and addition of 50 grams of sodium acetate, 6-hydroxy-2-methylamino-benzothiazole was obtained which upon crystallization from ethanol melted at 238–240° C.

EXAMPLE F

*6-hydroxy-2-n-hexylamino-benzothiazole*

70 grams of p-methoxyphenyl-isothiocyanate were dissolved in 200 cc. of ligroin (B. P. 90–120° C.) and 52 grams of n-hexylamine in 150 cc. of ligroin were slowly added. The reaction mixture was heated on a steam bath at 90° C. for 4 hours. After cooling for about 16 hours at 4° C. the 1-(p-methoxyphenyl) - 3 - (n - hexyl) thiourea was filtered off. Upon crystallization from petroleum ether the compound melted at 73° C. 80 grams of the compound were dissolved in 250 cc. of chloroform and 54 grams of bromine in 100 cc. of chloroform were slowly added while maintaining the temperature of the mixture at 15–20° C. The reaction mixture was then refluxed on a steam bath for 4 hours. The chloroform was distilled off in vacuo and the yellow residue was crystallized from ethanol-ether. Upon further crystallization from ethanol-ether the 6-methoxy-2-n-hexylamino-benzothiazole hydrobromide thus obtained melted at 134–136° C. The hydrobromide was suspended in 1000 cc. of N hydrochloric acid and heated to 80° C. Solid crystalline sodium acetate was added with stirring until the reaction of the mixture was neutral to congo. The mixture was cooled to 10° C. and the 6-methoxy-2-n-hexylamino-benzothiazole thus obtained was filtered off. Upon recrystallization from ethanol-ether the compound melted at 60° C.

69 grams of 6-methoxy-2-n-hexylamino-benzothiazole were dissolved in 250 cc. of chlorobenzene and 80 grams of aluminum chloride were slowly added with stirring. The mixture was refluxed at 131° C. for 4 hours. After cooling to 40° C. the complex that formed was decomposed by the addition of small amounts of ice. The chlorobenzene was steam distilled off and the aqueous residue was treated with 15 cc. of concentrated hydrochloric acid. Upon cooling for about 16 hours at 4° C., the aqueous layer was decanted and the oily layer was treated with 1000 cc. of N sodium hydroxide at 60° C. The solution was filtered with diatomaceous earth and the filtrate was cooled in ice. The solution was acidified to litmus by the addition of 70 cc. of glacial acetic acid. The 6-hydroxy-2-n-hexylamino-benzothiazole was filtered off and upon crystallization from dilute ethanol melted at 102–4° C.

EXAMPLE G

*6-hydroxy-2-isoamylamino-benzothiazole*

64 grams of p-methoxyphenyl-isothiocyanate was dissolved in 250 cc. of ligroin (B. P. 90–120° C.), and 40 grams of isoamylamine in 100 cc. of ligroin were slowly added. The mixture was heated on a steam bath at 84° C. for 3½ hours. After cooling in ice, the crystalline compound was filtered off. Upon recrystallization of the thus obtained 1-(p-methoxyphenyl)-3-isoamyl-thiourea from petroleum ether, it melted at 81–83° C. 41 grams of the compound were dissolved in 250 cc. of chloroform and 30 grams of bromine in 100 cc. of chloroform were slowly added at 15–20° C. The mixture was refluxed on a steam bath for 4 hours. The solvent was distilled off in vacuo and 6-methoxy-2-isoamyl-amino-benzothiazole hydrobromide was obtained as yellow crystals. After recrystallization from alcohol-ether the compound melted at 153–155° C. 36 grams of the hydrobromide were dissolved in 2 liters of N hydrochloric acid at 85° C. The solution was filtered and 350 grams of crystalline sodium acetate were added to congo neutral reaction. 6-methoxy-2-isoamylamino-benzothiazole precipitated and upon recrystallization from aqueous alcohol, it melted at 47–49° C.

28 grams of the last mentioned compound were dissolved in 250 cc. of chlorobenzene. 45 grams of aluminum chloride were slowly added with stirring and the mixture was refluxed at 141° C. for 3 hours. After cooling to 45° C. the complex was decomposed by the addition of small amounts of ice. The chlorobenzene was steam distilled off and the aqueous residue was treated with 15 cc. of concentrated hydrochloric acid. The mixture was cooled at 4° C. for about 16 hours. The aqueous layer was decanted and the residual oil was dissolved in 1000 cc. of N sodium hydroxide at 60° C. The solution was filtered with diatomaceous earth, cooled in ice and acidified to litmus with 70 cc. of glacial acetic acid, whereupon there was precipitated 6-hydroxy-2-isoamyl-amino-benzothiazole.

The following examples will serve to illustrate the preparation of the 2-mono lower alkylamino-6-(dialkylaminoalkoxy)-benzothiazoles.

EXAMPLE 1

*6-(β - diethylaminoethoxy) - 2 - n - butylamino-benzothiazole*

23 grams of 6-hydroxy-2-n-butylamino-benzothiazole were suspended in 250 cc. of chlorobenzene, then 15 cc. of 50% sodium hydroxide solution were added and the mixture was distilled until the boiling point reached 134 °C. 100 cc. of chlorobenzene were added and the solution was cooled to 65° C. 150 cc. of chlorobenzene containing 15 grams of 1-diethylamino-2-chloroethane were added and the mixture was refluxed at 134° C. for 3½ hours. After cooling to room temperature, 100 cc. of water were added and the mixture was stirred for ½ hour. The chlorobenzene phase was separated, dried over sodium sulfate, filtered and concentrated in vacuo. The 6 - (β - diethylaminoethoxy) - 2 - n - butylamino-benzothiazole was obtained as an oil which boiled at 216° C. and 0.005 mm. mercury pressure. By dissolving 1 gram of the compound in 14 cc. of N hydrochloric acid a solution of the dihydrochloride was obtained.

EXAMPLE 2

*6 - (β - diethylaminoethoxy) - 2 - isobutylamino-benzothiazole*

18 grams of 6-hydroxy-2-isobutylamino-benzothiazole were suspended in 350 cc. of chlorobenzene. 5 grams of sodium hydroxide flakes and 15 cc. of water were added and the mixture was distilled until the boiling point rose to 132° C. 250 cc. of chlorobenzene were added and the solution was cooled to 50° C. Then 15 grams of 1-diethylamino-2-chloro-ethane in 150 cc. of chlorobenzene were added and the mixture was refluxed at 133° C. for 4 hours. After cooling to 40° C., 150 cc. of water were added and the solution was stirred for ½ hour. The chlorobenzene phase was separated, dried with sodium sulfate, filtered and concentrated in vacuo. The 6 - (β - diethylaminoethoxy) - 2 - isobutylamino-benzothiazole thus obtained boiled at 207° C. and 0.05 mm. mercury pressure.

EXAMPLE 3

*6 - (β - diethylaminoethoxy) - 2 - n - propyl-amino-benzothiazole*

45 grams of 6-hydroxy-2-n-propylamino-benzothiazole were suspended in 250 cc. of chlorobenzene. 10 grams of sodium hydroxide flakes and 10 cc. of water were added and the mixture was distilled until the boiling point reached 133° C. 100 cc. of chlorobenzene were added and the mixture was cooled to 60° C. 50 grams of 1-diethylamino-2-chloro-ethane and 175 cc. of chlorobenzene were added and the solution was refluxed at 133° C. for 3½ hours. After cooling to room temperature, 100 cc. of water were added and the mixture was stirred for ½ hour. The chlorobenzene layer was separated, dried over sodium sulfate, and after filtration, was concentrated in vacuo. The 6-(β-diethylaminoethoxy)-2-n-propylamino-benzothiazole thus obtained was an oil which boiled at 206° C. and 0.3 mm. mercury pressure.

EXAMPLE 4

*6 - (β - diethylaminoethoxy) - 2 - n - amylamino-benzothiazole*

10 grams of 6-hydroxy-2-n-amylamino-benzothiazole were suspended in 220 cc. of chlorobenzene. 3 grams of sodium hydroxide flakes and 10 cc. of water were added and the mixture was distilled until the boiling point reached 130° C. 150 cc. of chlorobenzene were added and the solution was cooled to 45° C. 8 grams of 1-diethylamino-2-chloro-ethane and 75 cc. of chlorobenzene were then added and the mixture was refluxed at 130° C. for 4 hours. The solution was cooled to 40° C. and 100 cc. of water were added. After ½ hour of stirring the chlorobenzene layer was separated, dried over sodium sulfate, filtered and concentrated in vacuo. The 6-(β-diethylaminoethoxy)-2-n-amylamino-benzothiazole was obtained as an oil which boiled at 206° C. and 0.06 mm. mercury pressure.

EXAMPLE 5

*6 - (β - diethylaminoethoxy) - 2 - methylamino-benzothiazole*

21.5 grams of 6-hydroxy-2-methylamino-benzothiazole were suspended in 250 cc. of chlorobenzene. 5 grams of sodium hydroxide flakes and 5 cc. of water were added. The mixture was distilled until the boiling point reached 132° C. 150 cc. of chlorobenzene were added and the solution was cooled to 60° C. 27 grams of 1-diethylamino-2-chloro-ethane were added and the mixture was refluxed at 130–135° C. for 5 hours. After cooling, 125 cc. of water were added and the mixture was stirred for ½ hour. The chlorobenzene layer was filtered and dried over sodium sulfate. The filtrate was concentrated in vacuo and the residual oil was distilled in vacuo at 213–5° C. at 0.3 mm. mercury pressure. 18 grams of the 6-(β-diethylaminoethoxy)-2-methylamino-benzothiazole thus obtained were dissolved in 300 cc. of methanol and cooled in ice. 9 grams of hydrogen chloride in 45 cc. of methanol were added and the solution was diluted to 2 liters with ether. The resulting precipitate was filtered off and upon crystallization from ethanol-ether, the 6-(β-diethylaminoethoxy)-2-methylamino-benzothiazole dihydrochloride thus obtained melted at 257–9° C.

EXAMPLE 6

*6-(β-diethylaminoethoxy)-2-n-hexylamino-benzothiazole*

56 grams of 6-hydroxy-2-n-hexylamino-benzothiazole were suspended in 250 cc. of chlorobenzene. 12 grams of sodium hydroxide flakes and 12 cc. of water were added and the mixture was distilled until the boiling point rose to 133° C. 150 cc. of chlorobenzene were added and the mixture was cooled to 50° C. A solution of 40 grams of 1-diethylamino-2-chloro-ethane in 100 cc. of chlorobenzene were added and the mixture was refluxed at 139° C. for 4 hours. After cooling to 40° C., 150 cc. of water were added and the solution was stirred for ½ hour. The chlorobenzene phase was separated from the aqueous layer which was extracted with 150 cc. of chlorobenzene. The combined chlorobenzene extracts were dried over sodium sulfate. After filtration the solution was concentrated in vacuo on the steam bath. The 6-(β-diethylaminoethoxy)-2-n-hexylamino-benzothiazole was obtained as an oil which was distilled at 223–226° C. and 0.03 mm. mercury pressure.

EXAMPLE 7

*6-(β-diethylaminoethoxy)-2-isoamylamino-benzothiazole*

26 grams of 6-hydroxy-2-isoamylamino-benzothiazole were dissolved in 250 cc. of chlorobenzene and 6 grams of sodium hydroxide flakes and 6 cc. of water were added. The mixture was distilled until the boiling point reached 133° C. and 150 cc. of chlorobenzene were added. The solution was cooled to 40° C. and 20 grams of 1-diethylamino-2-chloro-ethane in 70 cc. of chlorobenzene were added. The mixture was refluxed at 129° C. for 4 hours. After cooling to room temperature, 150 cc. of water were added and the solution was stirred for ½ hour. The chlorobenzene phase was filtered and dried over sodium sulfate. The dried filtrate was concentrated in vacuo and 6-(β-diethylaminoethoxy)-2-isoamylamino-benzothiazole was obtained as an oil which boiled at 203–206° C. and 0.01 mm. mercury pressure. The dihydrochloride was obtained by dissolving 5 grams of the base in 25 cc. of methanol, adding 2 grams of hydrogen chloride gas dissolved in 20 cc. of methanol, cooling and diluting the mixture to 200 cc. with ether. The dihydrochloride obtained was crystallized from isopropanol and ether and melted at 197–199° C. The dihydrobromide of 6-(β-diethylaminoethoxy)-2-isoamylamino-benzothiazole as well as the hydrohalides of the other 2-mono lower alkylamino-6-(dialkylaminoalkoxy)-benzothiazoles disclosed herein can be prepared in an analogous manner.

We claim:

1. A compound of the group consisting of 2-mono lower alkylamino-6-(di-lower alkylaminoalkoxy)-benzothiazoles, wherein the "alkoxy" radical contains from 2 to 5 carbon atoms, and the acid addition salts thereof.

2. 2-mono lower alkylamino-6-(diethylaminoethoxy)-benzothiazoles.

3. 6-(β-diethylaminoethoxy)-2-n-butyl-amino-benzothiazole.

4. 6-(β-diethylaminoethoxy)-2-isobutyl-amino-benzothiazole.

5. 6-(β-diethylaminoethoxy)-2-n-propyl-amino-benzothiazole.

6. 6-(β-diethylaminoethoxy)-2-n-amyl-amino-benzothiazole.

7. 6-(β-diethylaminoethoxy)-2-n-hexyl-amino-benzothiazole.

NORBERT STEIGER.
OSCAR KELLER.

References Cited in the file of this patent

UNITED STATES PATENTS

| Number | Name | Date |
| --- | --- | --- |
| 2,578,757 | Steiger et al. | Dec. 18, 1951 |

FOREIGN PATENTS

| Number | Country | Date |
| --- | --- | --- |
| 295,295 | Great Britain | July 30, 1928 |
| 306,590 | Great Britain | Feb. 25, 1929 |
| 424,476 | Great Britain | Feb. 21, 1935 |